US012340737B2

(12) United States Patent
Miscuglio et al.

(10) Patent No.: US 12,340,737 B2
(45) Date of Patent: Jun. 24, 2025

(54) GLOBAL NONLINEAR SCALER FOR MULTIPLE PIXEL GAMMA RESPONSE COMPENSATION

(71) Applicant: Apple Inc., Cupertino, CA (US)

(72) Inventors: Mario Miscuglio, Sunnyvale, CA (US); Kingsuk Brahma, Mountain View, CA (US); Jie Won Ryu, Santa Clara, CA (US); Shengkui Gao, Shoreline, WA (US); Yuchi Che, Santa Clara, CA (US); Graeme M Williams, San Diego, CA (US); Yi Qiao, San Jose, CA (US); Wei H Yao, Palo Alto, CA (US); Jean-Pierre S Guillou, La Jolla, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/509,592

(22) Filed: Nov. 15, 2023

(65) Prior Publication Data

US 2024/0203332 A1 Jun. 20, 2024

Related U.S. Application Data

(60) Provisional application No. 63/433,312, filed on Dec. 16, 2022.

(51) Int. Cl.
*G09G 3/3208* (2016.01)
*G09G 3/32* (2016.01)

(52) U.S. Cl.
CPC ............. *G09G 3/3208* (2013.01); *G09G 3/32* (2013.01); *G09G 2300/0828* (2013.01); *G09G 2320/0276* (2013.01)

(58) Field of Classification Search
CPC ... G09G 2300/0828; G09G 2320/0276; G09G 3/32; G09G 3/3208; G09G 3/20;
(Continued)

(56) References Cited

U.S. PATENT DOCUMENTS 7,504,979 B1 * 3/2009 Knausz ............... H03M 1/0648 345/98
11,170,724 B2 11/2021 Li
(Continued)

FOREIGN PATENT DOCUMENTS

CN 115641815 A 1/2023

*Primary Examiner* — Richard J Hong
(74) *Attorney, Agent, or Firm* — Fletcher Yoder, P.C.

(57) ABSTRACT

In a display characterized by regions with different pixel responses due, for example, to local pixel density variation, voltage-to-luminance matching may be non-universal. Therefore, in order to avoid visual artifacts that may hinder a desired visualization of displayed content, it may be advantageous to compensate the different gamma responses. In some cases, such as with electronic devices having a single pixel density across the display, optical calibration may be performed to determine voltage-to-luminance matching. However, in electronic devices with local pixel density variations, it may be disadvantageous to perform optical calibrations for each region with a different pixel density. Instead of using two distinct gamma curves which may include dedicated optical calibration, a global nonlinear scaler (GNLS) compensation may be applied. Embodiments may pertain to techniques for applying a per-channel and band-global gamma-to-voltage compensation to reduce or minimize a relative luminance error amongst different responses of display regions.

20 Claims, 7 Drawing Sheets

(58) Field of Classification Search
CPC ... G09G 3/3258; G09G 3/3291; H03M 1/664; H03M 1/0648
See application file for complete search history.

(56) References Cited

U.S. PATENT DOCUMENTS

| | | | | |
|---|---|---|---|---|
| 11,436,962 | B2 | 9/2022 | Furihata | |
| 2010/0141493 | A1* | 6/2010 | Cho | H03M 1/664 341/145 |
| 2013/0162617 | A1* | 6/2013 | Yoon | G09G 3/3291 345/76 |
| 2015/0187278 | A1* | 7/2015 | Park | G09G 3/3291 345/212 |
| 2015/0213757 | A1* | 7/2015 | Takahama | G09G 3/3291 345/691 |
| 2018/0005578 | A1* | 1/2018 | Vahid Far | G09G 3/3258 |
| 2019/0019459 | A1* | 1/2019 | Vahid Far | G09G 3/3258 |
| 2022/0223081 | A1* | 7/2022 | Furihata | G09G 3/20 |

* cited by examiner

GLOBAL NONLINEAR SCALER FOR MULTIPLE PIXEL GAMMA RESPONSE COMPENSATION

CROSS-REFERENCE TO RELATED APPLICATION

This application claims priority to U.S. Provisional Patent Application No. 63/433,312, entitled "GLOBAL NONLINEAR SCALER FOR MULTIPLE PIXEL GAMMA RESPONSE COMPENSATION," filed on Dec. 16, 2022, which is hereby incorporated by reference in its entirety for all purposes.

SUMMARY

This disclosure relates to systems and methods for compensating the gamma response of various display regions having different gamma characteristics on an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

Gamma correction is a nonlinear operation used to encode and decode luminance and tristimulus values in images and videos. Each pixel value of an indexed color frame is proportional to a physical sub-pixel data voltage. In a display characterized by regions with different pixel responses due, for example, to local pixel density variation, to power supply variation, or to device non-idealities, voltage-to-luminance matching may be non-universal. Therefore, in order to avoid visual artifacts (e.g., front-of-screen (FoS) artifacts) that may hinder a desired visualization of displayed content, it may be advantageous to compensate the different gamma responses. In some cases, such as with electronic devices having a single pixel density across the display, optical calibration may be performed to determine voltage-to-luminance matching. However, in electronic devices with local pixel density variations, it may become too computationally intensive and too time consuming to perform optical calibrations for each region with a different pixel density.

Instead of using two distinct gamma curves which may include dedicated optical calibration, a global nonlinear scaler (GNLS) compensation may be applied, thus enabling one gamma to map the others using predictive modeling or statistical data as reference. The GNLS compensation may be provided via hardware, software, or GNLS algorithms executed on dedicated or general-purpose hardware. One or more embodiments may pertain to techniques for applying a per-channel and band-global gamma-to-voltage compensation to reduce or minimize a relative luminance error amongst different responses of display regions. A nonlinear gamma compensation between two display regions may include populating a limited-entry gamma-to-voltage lookup table (LUT) and generating a signed offset function. Remaining entries may be interpolated.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
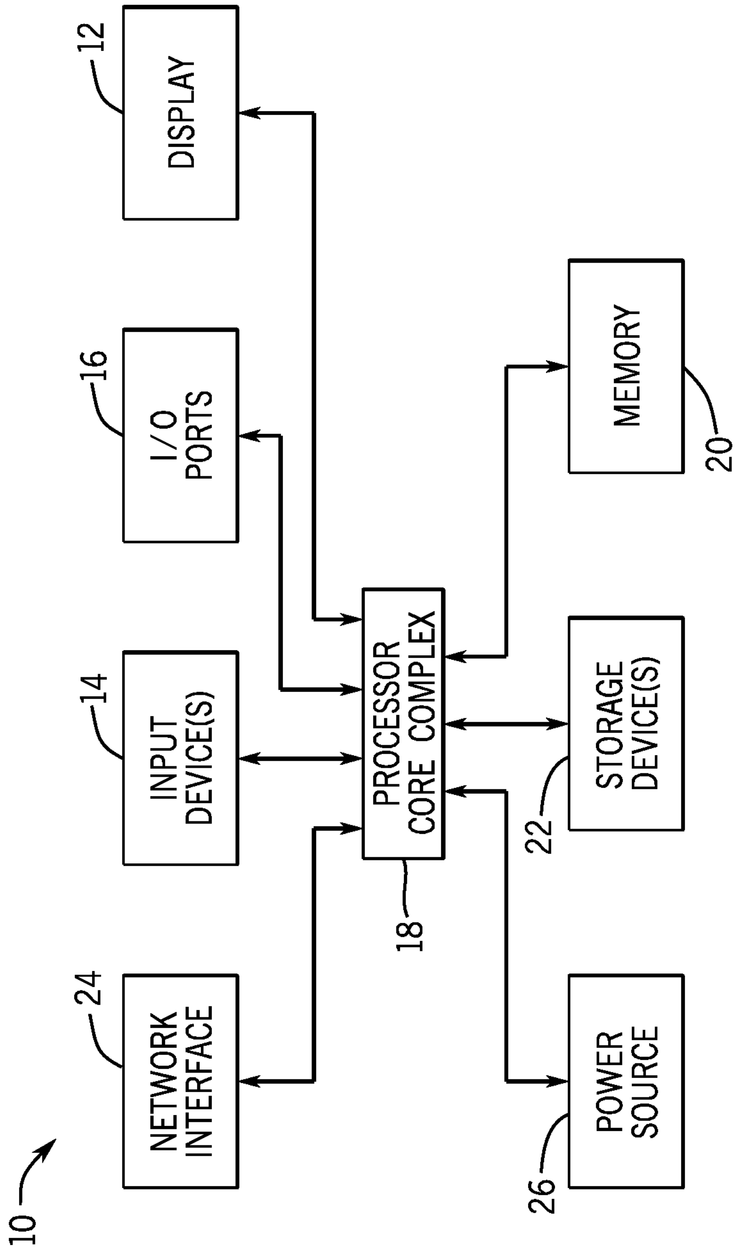
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

In a display characterized by regions with different pixel responses due, for example, to local pixel density variation, to power supply variation, or to device non-idealities, voltage-to-luminance matching may be non-universal. Therefore, in order to avoid visual artifacts (e.g., front-of-screen (FoS) artifacts) that may hinder a desired visualization of displayed content, it may be advantageous to compensate the different gamma responses. In some cases, such as with electronic devices having a single pixel density across the display, optical calibration may be performed to determine voltage-to-luminance matching. However, in electronic devices with local pixel density variations or regions having different optical characteristics for other reasons, it may become too computationally intensive and too time consuming to perform optical calibrations for each region with different optical characteristics corresponding to a different gamma response.

Instead of using distinct gamma curves for each display region having different optical characteristics (e.g., corresponding to different gamma responses) that may include dedicated optical calibration, a global nonlinear scaler (GNLS) compensation may be applied to obtain a gamma value. In other words, this may enable one gamma value corresponding to a first display region to map the others using predictive modeling or statistical data as reference. The GNLS compensation may be provided via hardware, software, or GNLS algorithms executed on dedicated or general-purpose hardware. Some embodiments may pertain to techniques for applying a per-channel and band-global gamma-to-voltage compensation to reduce (e.g., minimize) a relative luminance error amongst different responses of display regions. A nonlinear gamma compensation between two display regions may include populating a limited-entry gamma-to-voltage LUT and generating a signed offset function. Remaining entries may be interpolated. For example, the remaining entries may be interpolated via linear or nonlinear interpolation.

The GNLS compensation algorithm may perform tap point optimization by determining positions of one or more voltage tap points of maximum relative luminance variability (entries of a GNLS LUT) of two relative luminance error profiles such that $$\frac{L_1(V) - L_2(V)}{L_1(V)} = \frac{\Delta L}{L}(V),$$

where a function $f_i$ is a linearly interpolated function that uses the tap points as anchor points. In some embodiments, the GNLS compensation algorithm may determine the tap points using a threshold that may compute abrupt changes in a slope and intercept of the luminance error profiles. The GNLS compensation algorithm may iteratively minimize the sum of one or more cost functions to determine the locations of the tap points. In other embodiments, the locations of the tap points may be determined using heuristic and exact dynamic programming methods.

After the tap point optimization, each voltage tap may correspond to a voltage tap offset and a corresponding linearly interpolated function may be generated such that $$\frac{L_1(V) - L_1(V + \Delta V)}{L_1(V)} = \frac{\Delta L}{L} \to 0,$$

or is below a perceivable contrast sensitivity.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
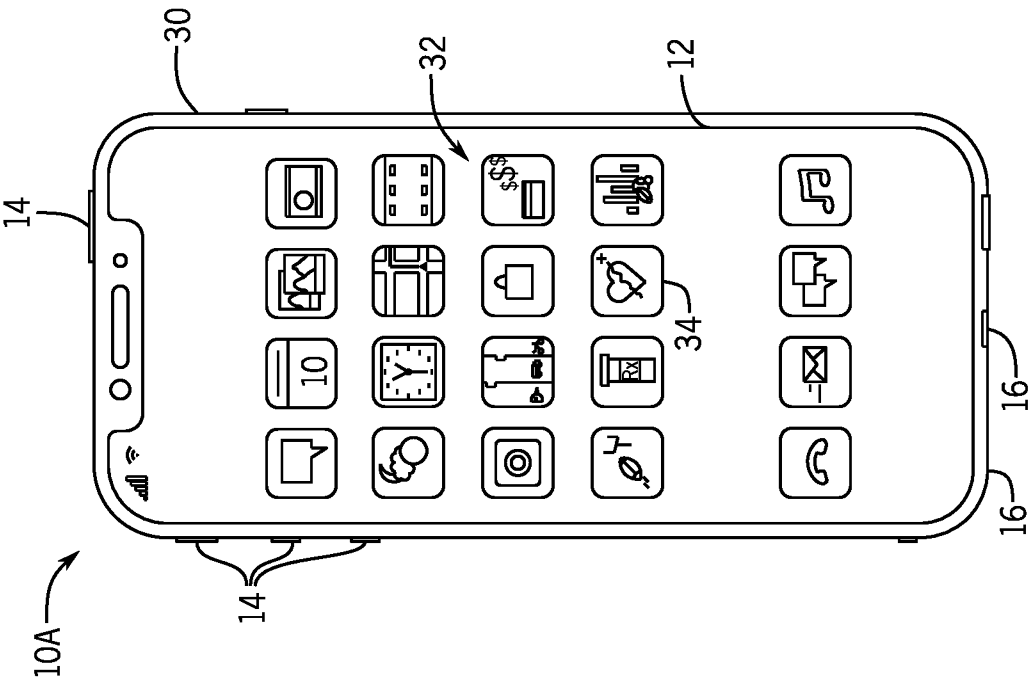
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
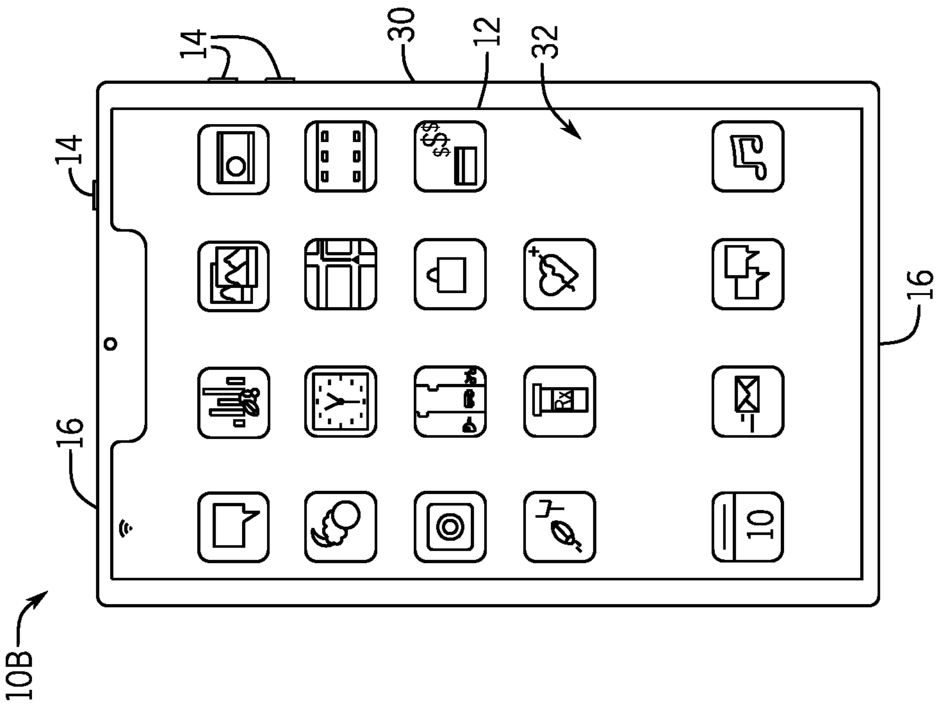
FIG. 3 is an example of the electronic device in the form of a tablet device, in accordance with an embodiment.
Figure 4:
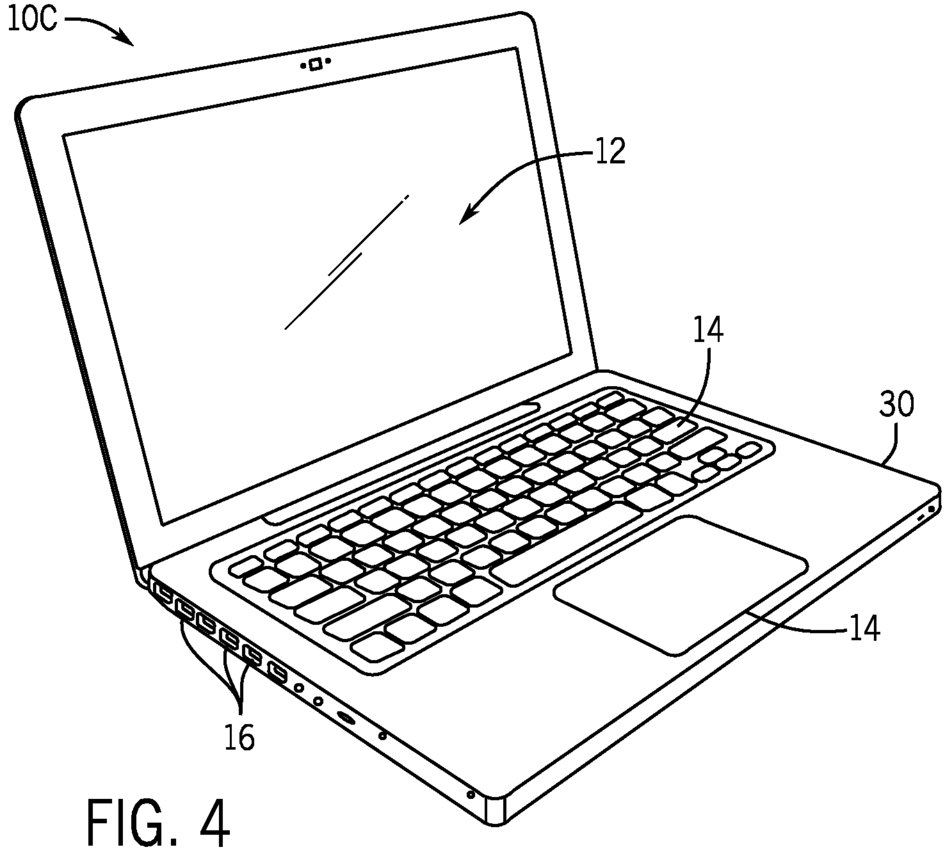
FIG. 4 is an example of the electronic device in the form of a notebook computer, in accordance with an embodiment.
Figure 5:
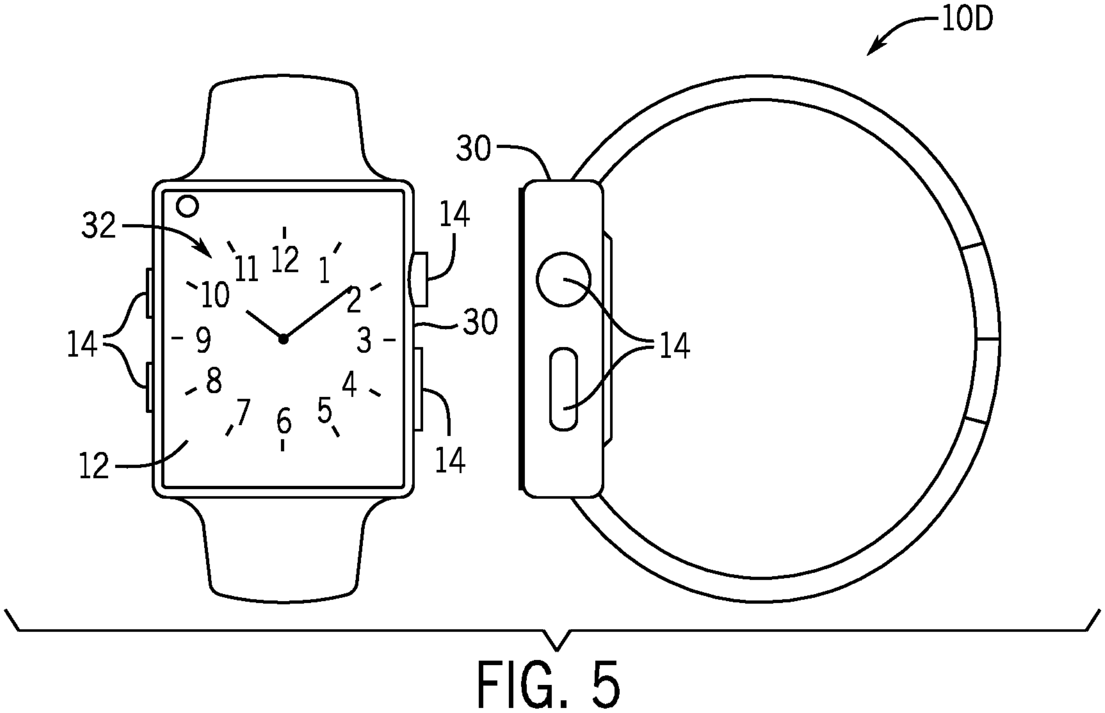
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
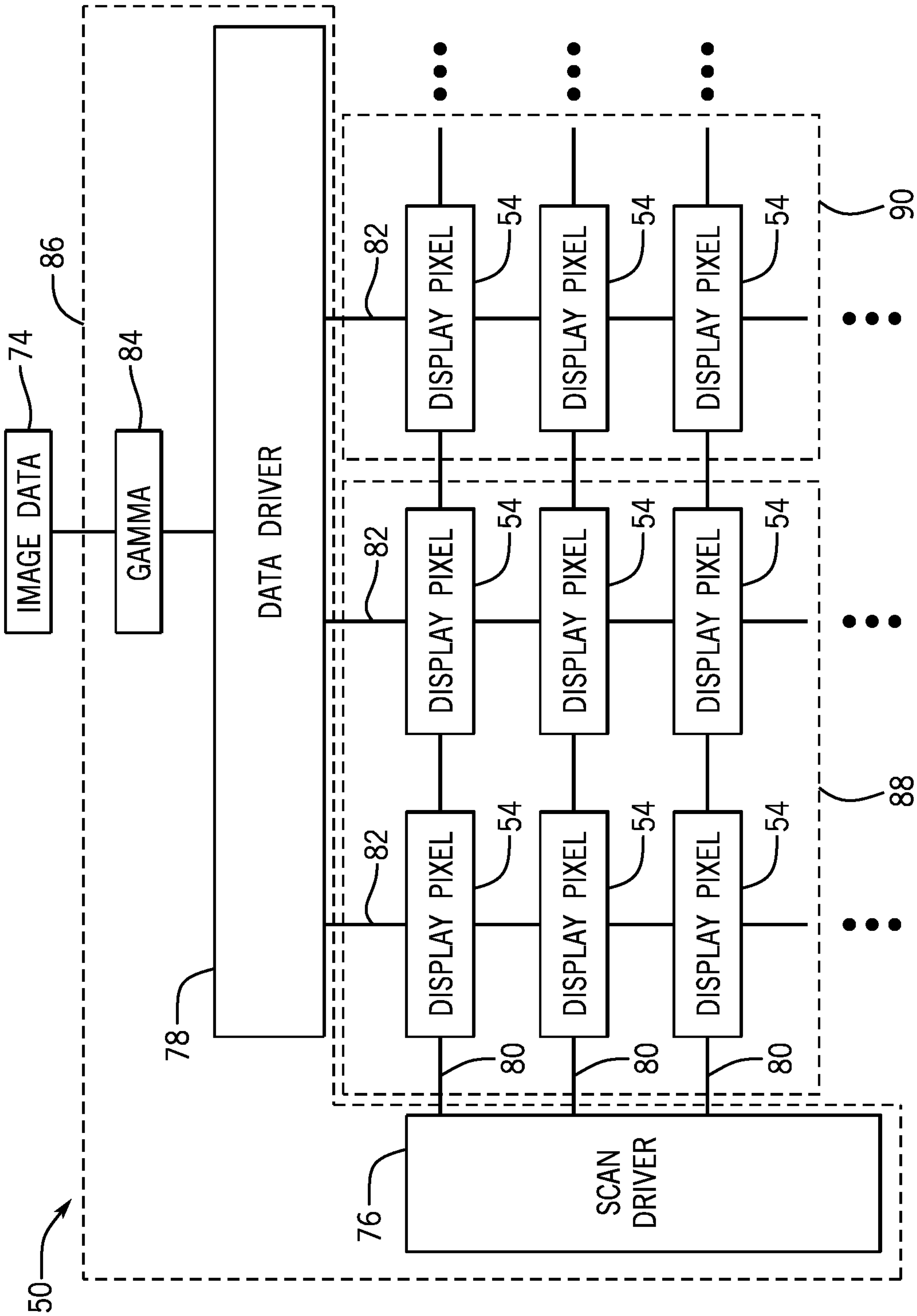
FIG. 6 is a block diagram of the electronic display, in accordance with an embodiment.

FIG. 6 is a block diagram of a display pixel array 50 of the electronic display 12. It should be understood that, in an actual implementation, additional or fewer components may be included in the display pixel array 50. The electronic display 12 may receive any suitable image data (e.g., image data 74) for presentation on the electronic display 12. The electronic display 12 includes a display driver integrated circuit (DDIC) 86 that includes scan driver circuitry 76, data driver circuitry 78, and gamma 84. The DDIC 86 controls programming the image data 74 into the display pixels 54 for presentation of an image frame via light emitted according to each respective bit of image data 74 programmed into one or more of the display pixels 54. The display pixel array 50 of the display 12 may include multiple areas of varying pixel densities. For example, the pixel array 50 may include a region 88 and a region 90, where the region 88 has a greater pixel density than the region 90.

The display pixels 54 may each include one or more self-emissive elements, such as a light-emitting diodes (LEDs) (e.g., organic light emitting diodes (OLEDs) or micro-LEDs (μLEDs)); however, other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress, emission (EM)) on scan lines 80 to control the display pixels 54 by row. For example, the scan driver circuitry 76 may cause a row of the display pixels 54 to become enabled to receive a portion of the compensated image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row. When the scan driver circuitry 76 provides an emission signal to certain display pixels 54, those display pixels 54 may emit light according to the image data 74 with which those display pixels 54 were programmed.

Figure 7:
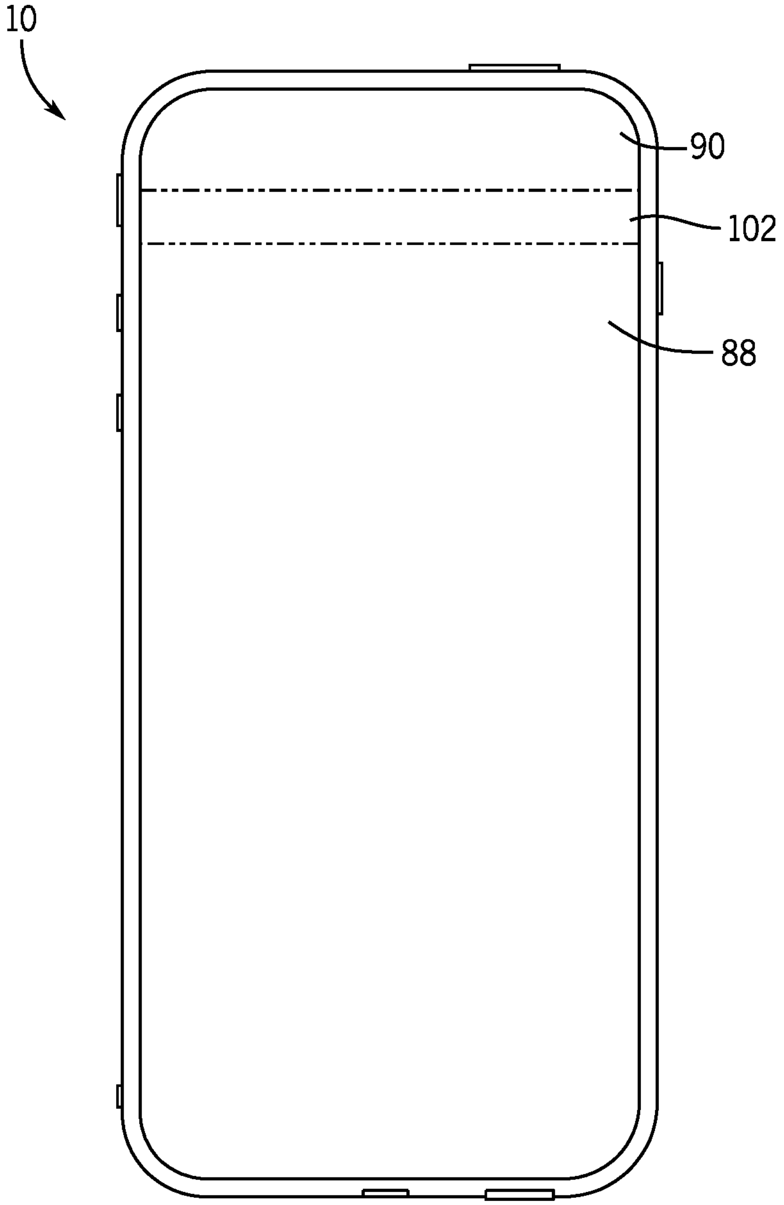
FIG. 7 is an electronic device including regions of varying pixel densities, in accordance with an embodiment.

FIG. 7 is an electronic device including regions of varying pixel densities, according to an embodiment of the present disclosure. The electronic device 10 includes the region 88 and the region 90, as well as a boundary region 102 between the regions 88 and 90. The varying pixel densities of the regions 88, 90, and the boundary region 102 may result in varying pixel responses for the region 88 and the region 90. The varying pixel responses may correspond to different gamma responses, which may, in some cases, produce visual artifacts that may hinder a desired visualization of the displayed content.

In some instances, the luminance responses for each of the regions 88, 90, and the boundary region 102 may be determined via optical calibration. However, it may be time consuming, costly, and computationally intensive to perform optical calibration on the regions 88, 90, and the boundary region 102. As will be discussed in greater detail below, it may be advantageous to perform optical calibration for the regions 88 and 90, and determine a luminance response for the boundary region 102 based on the luminance responses corresponding to the regions 88 and 90 by applying a global nonlinear scaler (GNLS) compensation to the display pixels 54 in the boundary region 102.

Figure 8:
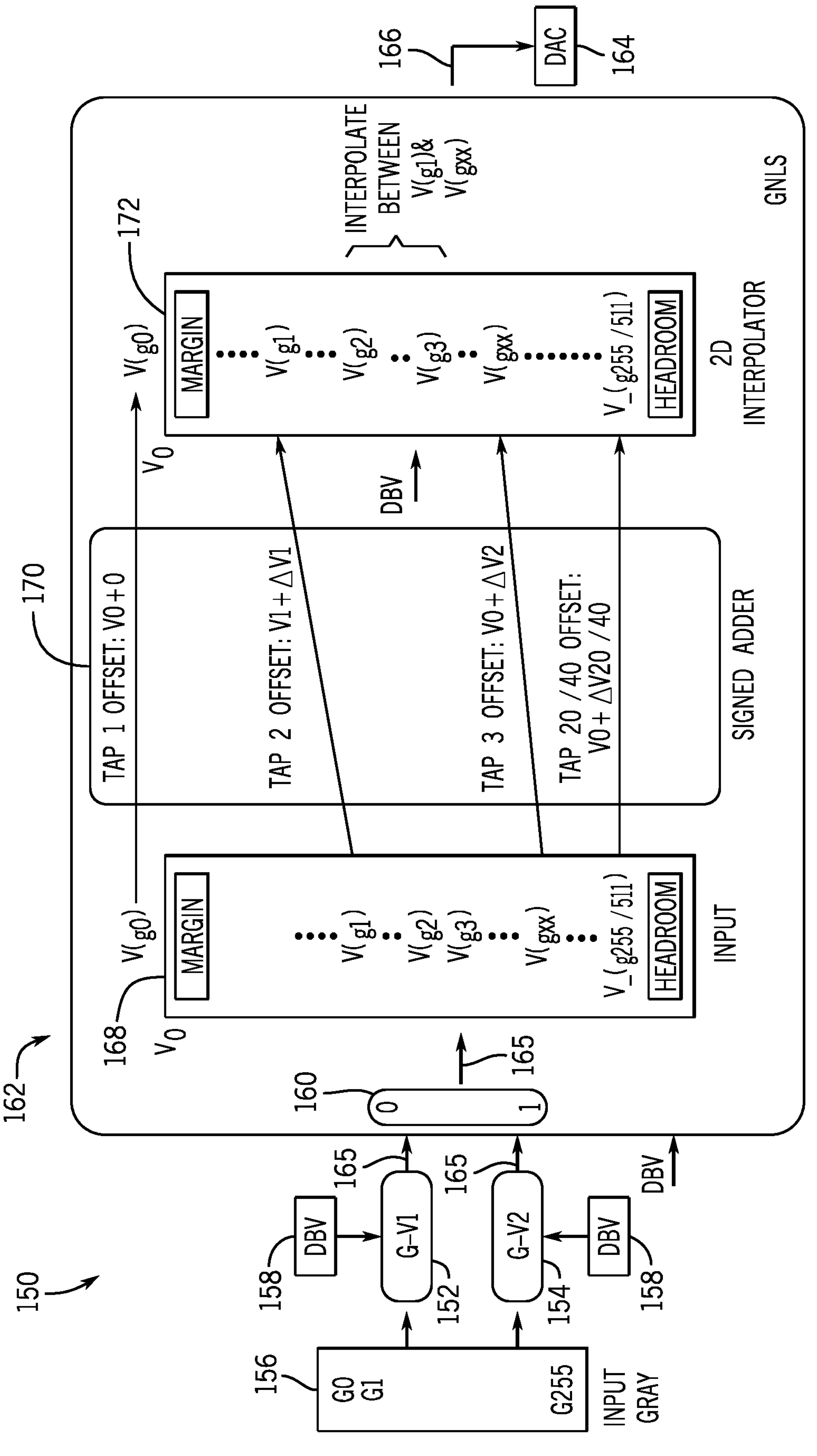
FIG. 8 is a logic diagram illustrating compensation circuitry for providing a luminance compensation for pixels of the electronic device of FIG. 1, in accordance with an embodiment.

FIG. 8 is a logic diagram illustrating compensation circuitry 150 for providing a luminance compensation for pixels of the electronic device 10, according to an embodiment of the present disclosure. The electronic device 10 may include gray-to-voltage lookup tables LUT 152 and LUT 154 stored in the memory 20 or the storage devices 22. The LUT 152 and the LUT 154 may respectively correspond to luminance responses of various regions of the electronic display 12. For example, the LUT 152 may correspond to and include luminance response information with respect to the region 88 and the LUT 154 may correspond to and include luminance response information with respect to the region 90. In some cases, the luminance response information may include gamma response information.

The gray-to-voltage relationships stored in the LUT 152 and the LUT 154 may be determined via optical calibration and may store information regarding the luminance responses for the various possible gray values from the gray level input 156, considering display brightness values (DBVs) 158 of the electronic display 12. A luminance response from the LUT 152 or the LUT 154 may be selected by a multiplexer 160 and inputted to the GNLS circuitry 162. The GNLS circuitry 162 may determine a voltage offset and apply the voltage offset to the luminance response corresponding to either the LUT 152 or the LUT 154. The GNLS circuitry 162 may output a digital value to a digital-to-analog converter (DAC) 164 that may convert the digital value to a voltage value to be programmed into one or more of the display pixels 54 in the boundary region 102.

Figure 9:
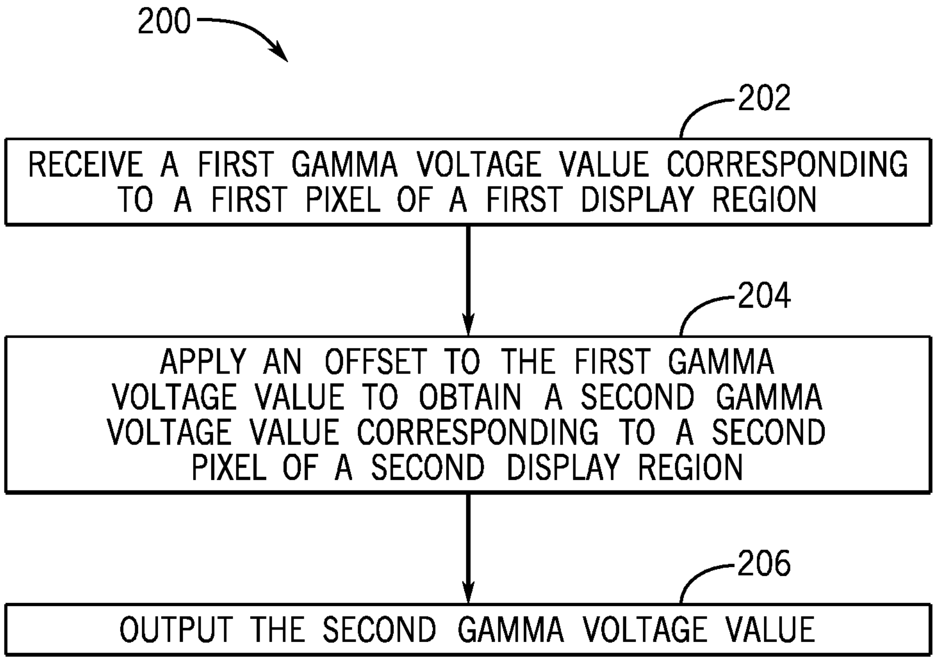
FIG. 9 is a flowchart of a method for performing GNLS compensation, in accordance with an embodiment.

FIG. 9 is a flowchart of a method 200 for performing GNLS compensation, according to an embodiment of the present disclosure. Any suitable device (e.g., a controller) that may control components of the electronic device 10, may perform the method 200. In some embodiments, the method 200 may be implemented by executing instructions stored in a tangible, non-transitory, computer-readable medium, such as the memory 20 or storage devices 22, using the processor core complex 18. For example, the method 200 may be performed at least in part by one or more software components, such as an operating system of the electronic device 10, one or more software applications of the electronic device 10, and the like. While the method 200 is described using steps in a specific sequence, it should be understood that the present disclosure contemplates that the described steps may be performed in different sequences than the sequence illustrated, and certain described steps may be skipped or not performed altogether.

In process block 202, the GNLS circuitry 162 may receive an input gamma voltage value 165 corresponding to a first pixel of a first display region. For example, the gamma voltage value may be received from the LUT 152 or the LUT 154, which receives a gray level from the gray level input 156. While the gray level input 156 is shown to be an 8-bit input (e.g., ranging from a gray level value of 0 to a gray level value of 255), it should be noted that the gray level input 156 may include any appropriate size, such 9-bit or greater, 16-bit or greater, and so on. The LUT 152 and the LUT 154 may convert the gray level from the gray level input 156 to digital voltage values. In particular, the LUT 152 and the LUT 154 may convert the gray level to a gamma voltage value (e.g., may provide a gamma conversion). The multiplexer 160 of the GNLS circuitry 162 may determine whether the gamma voltage values corresponding to the LUT 152 or the LUT 154 are selected.

The selection may be based on design of the display pixels 54 in the boundary region 102. Measurements may be taken for displays pixels 54 in the boundary region 102 to determine whether the luminance response (e.g., gamma response) in the boundary region 102 is more similar to the region 88 or the region 90. For example, if it is determined that the luminance response for the boundary region 102 is more similar to the region 88, then the LUT 152 may be selected by the multiplexer 160. However, if it is determined that the luminance response for the boundary region 102 is more similar to the region 90, then the LUT 154 may be selected by the multiplexer 160.

In process block 204, the GNLS circuitry 162 may apply an offset to the input gamma voltage value 165 to reduce a luminance error corresponding to the boundary region 102. By applying the offset to the gamma voltage value, the GNLS circuitry 162 may adjust the input gray level to produce the output gamma voltage value 166 (e.g., a bit value). The output gamma voltage value 166 may indicate which tap points are to be selected in the DAC 164.

The GNLS circuitry 162 may store the input gamma voltage value 165 in an input table 168. An offset table 170 may store gray level offsets and apply the gray level offsets to the input gamma voltage value 165. The gray level offsets of the offset table 170 may adjust the input gamma voltage value 165 to produce the output gamma voltage value 166, which may adjust the tap points that correspond to the input gamma voltage value 165 such that a luminance error corresponding to the boundary region 102 is reduced or eliminated.

The offsets of the offset table 170 may be determined by taking a luminance error function of the boundary region and comparing the luminance error function of the boundary region to a luminance error function of the region 88 or the region 90. A compensation may be applied to the boundary region 102 to reduce the luminance error. It may then be determined whether a residual error persists after the compensation is applied. If a residual error persists, a residual error compensation may be applied to eliminate or further reduce the luminance error corresponding to the boundary region 102. Such residual error may be corrected on a single display level using pixel uniformity correction (PUC) adjustments as additional gain using 2D captures at opportune luminance (e.g., where the residual error is larger) or by per part GNLS adjustments using calibration.

An interpolation table 172 may apply an interpolation, such as a linear interpolation, to the offset input gamma voltage value 165. The linear interpolation table may further adjust the input gamma voltage value 165 such that the input gamma voltage value 165 may correspond to a different tap point of the DAC 164. Applying the offset via the offset table 170 and the interpolation via the interpolation table 172 may generate the output gamma voltage value 166.

In an embodiment, the GNLS circuitry 162 may perform tap point optimization by determining positions of one or more voltage tap points of maximum relative luminance variability of two relative luminance error profiles such that $$\frac{L_1(V) - L_2(V)}{L_1(V)} = \frac{\Delta L}{L}(V),$$

where a function $f_i$ is a linearly interpolated function that uses the tap points as anchor points. The GNLS circuitry 162 may determine the tap points using an automatic threshold that may compute abrupt changes in a slope and intercept of the luminance error profiles. The GNLS circuitry 162 may iteratively minimize the sum of one or more cost functions to determine the locations of the tap points. In other embodiments, the locations of the tap points may be determined using heuristic and exact dynamic programming methods. After the tap point optimization, each voltage tap may correspond to a voltage tap offset and a corresponding linearly interpolated function may be generated such that $$\frac{L_1(V) - L_1(V + \Delta V)}{L_1(V)} = \frac{\Delta L}{L} \to 0,$$

or is below a perceivable contrast sensitivity.

In process block 206, the GNLS circuitry 162 outputs the output gamma voltage value 166 to the DAC 164. The DAC 164 converts the output gamma voltage value 166 to a voltage (e.g., by selecting a set of tap points) which is used to program the display pixels 54 in the boundary region 102. The DAC 164 may include a number of tap points that is less than the total number of gamma voltage values stored in the input table 168.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:

an electronic display comprising a first display region associated with first gamma response characteristics and a second display region associated with second gamma response characteristics; and processing circuitry configured to:

receive a gray level value corresponding to a first pixel of the second display region;

convert the gray level value to a first digital voltage value, the first digital voltage value configured to provide a first gamma conversion corresponding to the first gamma response characteristics;

apply an offset to the first digital voltage value to obtain a second digital voltage value corresponding to the second gamma response characteristics; and output the second digital voltage value to a digital-to-analog converter (DAC) to obtain an analog voltage corresponding to the second display region.

2. The electronic device of claim 1, wherein the first display region comprises a first gray level-to-voltage relationship and the second display region comprises a second gray level-to-voltage relationship.

3. The electronic device of claim 2, wherein the first gray level-to-voltage relationship is determined based on an optical calibration of the first display region.

4. The electronic device of claim 2, wherein the second gray level-to-voltage relationship is determined based on the first gray level-to-voltage relationship and the offset.

5. The electronic device of claim 2, wherein the first gray level-to-voltage relationship is stored in a lookup table.

6. The electronic device of claim 1, wherein the electronic display comprises a third display region, the third display region comprising a first pixel density greater than or equal to a second pixel density of the first display region.

7. The electronic device of claim 6, wherein the second display region is disposed between the first display region and the third display region.

8. A method, comprising:

receiving, at global nonlinear scaler (GNLS) compensation circuitry, a first gamma voltage value corresponding to a first pixel of a first display region or a second pixel of a second display region, the first display region comprising a first pixel density and the second display region comprising a second pixel density;

applying an offset to the first gamma voltage value to obtain a second gamma voltage value corresponding to a third pixel of a third display region to reduce a luminance error associated with the third display region; and outputting the second gamma voltage value to a digital-to-analog converter (DAC).

9. The method of claim 8, wherein the first pixel density is greater than the second pixel density.

10. The method of claim 8, wherein the GNLS compensation circuitry is configured to receive the first gamma voltage value corresponding to the first pixel of the first display region or the second pixel of the second display region based on a luminance response associated with the third display region.

11. The method of claim 10, wherein the luminance response associated with the third display region comprises a gamma response.

12. The method of claim 8, comprising:

wherein the GNLS compensation circuitry receives the first gamma voltage value from a first lookup table comprising an indication of a first number of tap points.

13. The method of claim 12, wherein the offset is obtained via a second lookup table comprising an indication of a second number of tap points, wherein the second number of tap points is less than the first number of tap points.

14. The method of claim 8, wherein applying the offset reduces the luminance error associated with the third display region.

15. The method of claim 8, wherein the third display region is positioned between the first display region and the second display region.

16. A tangible, non-transitory medium, comprising computer-readable instructions configured to, when executed, cause one or more processors to:

select a first gamma voltage value from a first lookup table corresponding to a first display region or a second gamma voltage value from a second lookup table corresponding to a second display region; and apply an offset to the first gamma voltage value or the second gamma voltage value, the offset based on a third lookup table, wherein applying the offset reduces a luminance error associated with a third display region.

17. The tangible, non-transitory medium of claim 16, wherein the first display region comprises a first pixel density, the second display region comprise a second pixel density, and the first pixel density is greater than the second pixel density.

18. The tangible, non-transitory medium of claim 16, comprising computer-readable instructions configured to, when executed, cause the one or more processors to generate, based on the offset applied to the first gamma voltage value or the second gamma voltage value, a third gamma voltage value.

19. The tangible, non-transitory medium of claim 18, comprising computer-readable instructions configured to, when executed, cause the one or more processors to:

output an indication of the second gamma voltage value to a digital-to-analog converter (DAC); and cause the DAC to select an adjusted tap point based on the indication of the second gamma voltage value.

20. The tangible, non-transitory medium of claim 16, wherein the first lookup table comprises an indication of a first number of tap points, the second lookup table comprises a second indication of a second number of tap points, and the third lookup table comprises a third indication of a third number of tap points, wherein the third number of tap points is less than the first number of tap points and the second number of tap points.

* * * * *